US006349304B1

(12) United States Patent
Boldt et al.

(10) Patent No.: US 6,349,304 B1
(45) Date of Patent: Feb. 19, 2002

(54) GRAPHICAL INTERFACE FOR COPYING SETTINGS FROM NETWORK SOURCE DEVICE TO NETWORK TARGET DEVICES WITHOUT TRANSMITTING VALUES NOT USABLE FOR FEATURES SUPPORTED BY NETWORK TARGET DEVICES

(75) Inventors: Gerald Donald Boldt, Longmont; Joan Stagaman Goddard; Stephen Edward Stucka, both of Boulder, all of CO (US)

(73) Assignee: International Business Machines Corporation

( * ) Notice: Subject to any disclaimer, the term of this patent is extended or adjusted under 35 U.S.C. 154(b) by 0 days.

(21) Appl. No.: 09/207,810

(22) Filed: Dec. 9, 1998

(51) Int. Cl.[7] ........................ G06F 15/177; G06F 3/00; G06F 13/00

(52) U.S. Cl. ........................ 707/102; 710/10; 710/104; 713/1; 713/100; 709/221; 709/222

(58) Field of Search .............................. 710/8, 10, 104; 713/1, 100; 709/221, 222

(56) References Cited

U.S. PATENT DOCUMENTS

| 4,974,151 A | * | 11/1990 | Advani et al. ................. 710/8 |
| 5,371,837 A | * | 12/1994 | Kimber et al. ................ 395/114 |
| 5,450,571 A | * | 9/1995 | Rosekrans et al. ........... 395/500 |
| 5,467,434 A | | 11/1995 | Hower, Jr. et al. |
| 5,564,109 A | * | 10/1996 | Snyder et al. ................ 395/828 |
| 5,678,002 A | | 10/1997 | Fawcett et al. |
| 5,692,111 A | * | 11/1997 | Marbry et al. ............... 395/114 |
| 5,727,135 A | * | 3/1998 | Webb et al. .................. 395/113 |
| 5,768,483 A | | 6/1998 | Maniwa et al. |
| 5,845,078 A | * | 12/1998 | Tezuka et al. ............ 395/200.52 |
| 5,901,286 A | * | 5/1999 | Danknick et al. ........ 395/200.33 |
| 5,905,906 A | * | 5/1999 | Goffinet et al. .............. 395/828 |
| 5,960,167 A | * | 9/1999 | Roberts et al. ................. 710/8 |
| 6,026,436 A | * | 2/2000 | Hawes ......................... 709/218 |
| 6,027,268 A | * | 2/2000 | Bischel et al. ............... 400/584 |
| 6,029,198 A | * | 2/2000 | Iizuka ......................... 709/223 |
| 6,055,227 A | * | 4/2000 | Lennert et al. .............. 370/254 |
| 6,074,345 A | * | 6/2000 | van Oostrom et al. ....... 600/300 |
| 6,216,177 B1 | * | 4/2001 | Mairs et al. .................... 710/6 |
| 6,226,649 B1 | * | 5/2001 | Bodamer et al. ............ 707/104 |

* cited by examiner

*Primary Examiner*—Thomas Lee
*Assistant Examiner*—Tanh Q. Nguyen
(74) *Attorney, Agent, or Firm*—David W. Victor; Konrad Raynes Victor & Mann

(57) ABSTRACT

Disclosed is a system and method for configuring a plurality of devices linked to a network, such as printers or any other network device, with a computer also linked to the network. A computer determines from the devices a source device. The computer then determines a set of features from features implemented in the source device. At least one value is set for each feature in the source device. The computer also determines at least one target device. For each target device, the computer then determines features from the determined set of features that the target device is capable of implementing. The computer then transmits to each target device via the network the values for the determined features the target device is capable of implementing. If there are multiple target devices, then different sets of values from the determined set of features may be transmitted to different target devices when the target devices have different capabilities with respect to the determined set of features. The target devices are configured with the values transmitted over the network.

42 Claims, 8 Drawing Sheets

GRAPHICAL INTERFACE FOR COPYING SETTINGS FROM NETWORK SOURCE DEVICE TO NETWORK TARGET DEVICES WITHOUT TRANSMITTING VALUES NOT USABLE FOR FEATURES SUPPORTED BY NETWORK TARGET DEVICES

BACKGROUND OF THE INVENTION

1. Field of the Invention

The present invention relates to a method and system for configuring devices over a network with settings and, in particular, copying the settings from one network device, such as a network printer, to a plurality of network devices, such as printers.

2. Description of the Related Art

Network printing systems generally comprise an assemblage of different printers, client computers, servers, and other components connected over a network. A print job is assembled at a client computer and transmitted over the network to a server linked to a variety of printers. The printers may have different printing capabilities. Thus, for a given submitted print job, some printers in the network may not be able to process the print job.

In managing a network printing system, a network administrator may need to alter the configuration and settings of printers throughout the network. Current products allow a network administrator to configure multiple printers. However, when configuring multiple printers, the network administrator must use a set of options or configurations that is common to all printers being configured. Thus, the network administrator is limited to applying a set of attributes and features offered at the printer with the least capabilities and range of possible settings. Moreover, other systems only allow a network administrator to configure printers that are from the same manufacturer or of the same model.

Accordingly, there is a need in the art for an improved method and system for configuring groups of printers and other devices in a network printing system.

SUMMARY OF THE PREFERRED EMBODIMENTS

To overcome the limitations in the prior art described above, preferred embodiments disclose a system and method for configuring a plurality of devices linked to a network with a computer also linked to the network. A computer determines from the devices a source device. The computer then determines a set of features from features implemented in the source device. At least one value is set for each feature in the source device. The computer also determines at least one target device. For each target device, the computer then determines features from the determined set of features that the target device is capable of implementing. The computer then transmits to each target device via the network the values for the determined features the target device is capable of implementing. If there are multiple target devices, then different sets of values from the determined set of features may be transmitted to different target devices when the target devices have different capabilities with respect to the determined set of features. The target devices are configured with the values transmitted over the network.

In further embodiments, the source device may be a file including values for features and the target devices may include one file in which feature values are stored.

In yet further embodiments, the target and source devices may be printers. In such case the features to copy from the source to target printers may include network interface properties, a print mode indicating either simplex or duplex printing, a setting to lock a console of the target printer, an authentication protocol setting, etc.

In still further embodiments, graphical dialog boxes may be displayed on a computer monitor attached to the computer. A network administrator or other user may use an input device connected to the computer to select a source printer, target printer, and values for features from the source printer to apply from the displayed dialog boxes.

Preferred embodiments provide an improved method and system for allowing a user, such as a network administrator, to copy the values for selected features from one device or file to multiple devices, such as printers, over a network. With preferred embodiments, the maximum number of values from selected features are applied, limited only by the capabilities of the target printers. If a target printer does not support a particular feature, than the values for that unsupported feature will not be transmitted to the target printer over the network. Thus, the maximum set of values from a user selected group of features are applied to each target device.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Hardware and Software Environment

Figure 1:
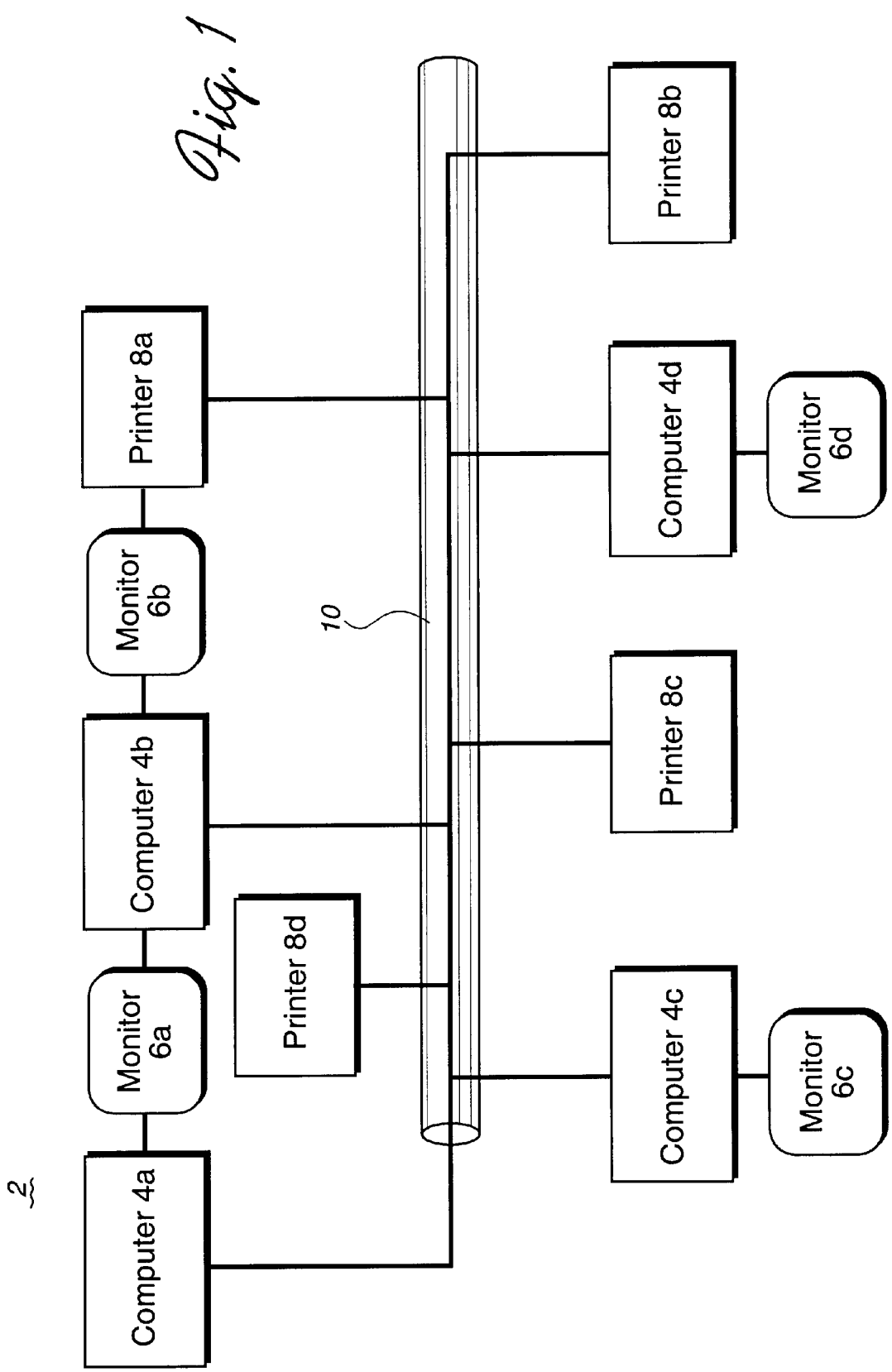
FIG. 1 is a block digram illustrating a software and hardware environment in which preferred embodiments of the present invention are implemented.

FIG. 1 illustrates a preferred hardware and software environment in which preferred embodiments of the present invention are implemented. A network printing system 2 is comprised of a plurality of computers 4a, b, c, d, and printers 8a, b, c, d. A network system 10 links the computers 4a, b, c, d and the printers 8a, b, c, d. The network 10 may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the computers 4a, b, c, d and the printers 8a, b, c, d.

The computers 4a, b, c, d may be comprised of client computers or servers that manage network printer operations, such as performing spooling and queuing for print jobs. The computer 4a, b, c, d may be any computer device known in the art, such as a desktop computer, laptop computer, workstation, mainframe, personal digital assistant (PDA), etc. The computer 4a, b, c, d may include an operating system such as AIX®, OS/390™, UNIX®, OS/2®, MVS™, WINDOWS®, etc. AIX and OS/2 are registered trademarks of IBM and OS/390 and MVS are trademarks of IBM; WINDOWS is a registered trademark of Microsoft Corporation; UNIX is a registered trademark licensed by the X/Open Company LTD. The computers 4a, b, c, d may also include software to submit print jobs to the printers 8a, b, c, d. Attached to each computer 4a, b, c, d is a display monitor 6a, b, c, d, which may be comprised of any computer display device known in the art.

The printers 8a, b, c, d may be any printer, plotter, three dimensional model builder or other similar output device known in the art. In preferred embodiments, the printers 8a, b, c, d and computers 4a, b, c, d include a network card and one or more ports to communicate with the network 10.

The computers 4a, b, c, d may include an attached display monitor 6a, b, c, d, which may be any suitable display device known in the art. An input device (not shown) would also be provided with the computers 4a, b, c, d to allow a systems administrator or other user to enter data into the computer 4a, b, c, d. This input device may be comprised of any input means known in the art, including a mouse, keyboard, touch screen display, voice activated input, electronic pen, etc.

In preferred embodiments, the computer 4a, b, c, d and printers 8a, b, c, d may communicate using the Simple Network Management Protocol (SNMP), or any other suitable network protocol known in the art. The SNMP protocol is described in Request for Comments No. 1157 (May 1990), entitled "A Simple Network Management Protocol (SNMP)," and No. 1759 (March 1995), entitled "Printer MIB," which documents are incorporated herein by reference in their entirety. The SNMP protocol provides for the interoperability of different devices communicating over a TCP/IP network, such as the Internet. Further, the SNMP protocol provides an authentication protocol which requires that a device on the network must provide appropriate authentication, e.g., a community name, in order to communicate and access a network printer 8a, b, c, d.

Those skilled in the art will appreciate that network protocols, e.g., Hypertext Transfer Protocol (HTTP), Data Link Control (DLC), etc., other than SNMP, may be used. Moreover, any computer 4a, b, c, d and printer 8a, b, c, d in the network 10 may be capable of communicating using one of multiple network protocols. In this way, a device need only be capable of communicating with one of the protocols available at the other device receiving the communication.

Printer Properties

Each printer 8a, b, c, d in the network 2 is capable of implementing particular features and has those features configured to specific values or settings. The feature offered at any one printer 8a, b, c, d and configuration of those features may vary throughout the network 10. Preferred embodiments allow a network administrator or other user to use a computer 4a, b, c, d to configure features with values within printers 8a, b, c, d throughout the network. Some of the features the computer 4a, b, c, d may configure with values within network printers 8a, b, c, d via the network 10 include:

Inputs: Can configure the default input tray attached to the printer 8a, b, c, d that is used to feed paper to the printer.

Outputs: Can configure the default output bin to receive printed material.

Simplex/Duplex: Can set whether the printer 8a, b, c, d, runs in duplex mode. (If Duplex does not appear, then the printer 8a, b, c, d can run only in simplex mode.) Simplex is single-sided printing and duplex is double sided printing. Specific values for simplex or duplex mode may also be set.

Interpreters: Can configure the values for interpreter properties of interpreters installed on the printer 8a, b, c, d. An interpreter is the software that transforms print instances into images that can be marked on the media, such as a process that transforms print files to a raster image process (RIP) image.

Locking: Can set a console lock feature to lock the printer 8a, b, c, d console to prevent someone else from changing the settings at the printer console interface. The values for this feature are either "on" or "off."

Toner density: Can set the degree of light and dark shade of the print. For example, the lower the number, the lighter the print; the higher the number, the darker the print. A typical range of values indicating the degree of darkness is 1–12.

Print quality: Can configure the degree of print quality. Examples of print quality values include:

Normal: Prints normal quality. Used for printing standard text or images where image fidelity is not required, such as for simple graphics or low-resolution images.

Economy: Prints lighter quality to save toner; sometimes referred to as Econo.

Refine: Prints higher quality with smooth edges. This may be used to produce prints that best represent the source and when image fidelity is important, such as for complex graphics, shading patterns, photographic images, very small point size single-byte fonts, or most double-byte fonts.

1200 Emulation: Prints as if the printer 8a, b, c, d had 1200 dots per inch (dpi) resolution. Typically only invoked when printing data created using 1200 dpi.

Delay before power save: The value to set is the length of time the printer 8a, b, c, d is inactive before it goes into power-saver mode, e.g., 30 minutes, if power-saver mode is available on the printer. In power-saver mode, the printer 8a, b, c, d powers down most of its systems to save power between print jobs. The printer 8a, b, c, d needs extra time to warm up when receiving a print job in power save mode.

Automatically continue after error: Can indicate whether the printer 8a, b, c, d should continue printing after a printing error. This feature takes either an "on" or "off" value.

Reprint jammed pages: Can indicate whether to reprint any pages that were caught inside the printer 8a, b, c, d during a paper jam. This feature takes either an "on" or "off" value.

Localization settings: The values to set are the natural language, country, and character set in which character strings are expressed. Changing the localization values alters the printer console display, not the printouts from the printer 8a, b, c, d.

Network interfaces for the printer: Depending on the network interfaces available at the printers 8a, b, c, d, the values for network interface properties can be copied from a source printer 8a, b, c, d to one or more target printers 8a, b, c, d and/or a printer file. Examples of network interfaces that may be used in the network printing system 2 include SNMP, HTTP, DCL, AppleTalk, NetBios, etc. Below are some examples of network interface properties (features) that may be configured for the NetBios, AppleTalk, SNMP, and other network interface protocols.

NetBIOS Protocol: The computer 4a, b, c, d can specify for one or more printers 8a, b, c, d whether the printers 8a, b, c, d are to accept print jobs and handle network traffic, such as broadcasts and announcements, using the Network Basic Input/Output System (NetBIOS) protocol. NetBIOS is an operating system interface for application programs used with personal computers, such as IBM computers, that are attached to a Token-Ring network. For the NetBIOS protocol, the computer 4a, b, c, d may modify for one or more printers 8a, b, c, d the following additional network features:

- Work Group Name: The value set is the name assigned to printer network workgroup, e.g., Workgroup_12.
- Maximum NetBIOS sessions: The value to set is the maximum number of NetBIOS sessions allotted to the printer 8a, b, c, d. This limits the number of workstations that can be attached to the printer network card as print devices.
- Maximum LLC connections: The value to set is the maximum number of Logical Link Control (LLC) connections the printer 8a, b, c, d can have. There is usually one LLC connection for each NetBIOS connection.
- Maximum SMB connections: The value to set is the maximum number of System Message Block (SMB) connections the printer can have. There are usually two SMB connections for each NetBIOS connection.

AppleTalk Protocol: The computer 4a, b, c, d can configure the values for network interface features for the AppleTalk protocol. AppleTalk is the protocol suite that provides peer-to-peer network architecture on Apple Macintosh personal computers. For example, the computer 4a, b, c, d may configure the values for the following AppleTalk protocol network features:

- Flow quantum: The value to set is the number of 512-byte buffers that the printer 8a, b, c, d can receive without acknowledgment.
- Checksum generation: Can set whether the CHECKSUM method is used for detecting errors when data is transmitted. This feature takes either an "on" or "off" value. CHECKSUM determines whether all the transmitted data is received. Using CHECKSUM might decrease the speed of data transmissions.

SNMP: The computer 4a, b, c, d may also configure the values for various network features for the SNMP network protocol, including:

- Communities: A community value is a password or authentication protocol that a system must provide to access another system in the network 10. A community may indicate the user's password rights, e.g., read, read or write, or no access. The computer 4a, b, c, d may configure the community or password associated with any printers 8a, b, c, d if the computer 4a, b, c, d has authority to make such changes. In order to access a printer 8a, b, c, d in the network 2, the computer 4a, b, c, d attempting access must communicate with a community value, i.e., password, that is assigned to the receiving printer 8a, b, c, d. If a printer 8a, b, c, d is assigned multiple communities, then the computer 4a, b, c, d attempting access need only use one of the communities assigned to the printer 8a, b, c, d to communicate.
- Trap hosts: The computer 4a, b, c, d may configure an IP or IPX trap host to monitor the printer network card.
- IP trap host: The value to set is the address of the management workstation that receives IP trap messages from the printer network card.
- IPX trap host: The value to set is the address of the management workstation that receives IPX trap messages from the printer network card.

Source Routing Settings: If the printers 8a, b, c, d include token-ring network cards, the computer 4a, b, c, d may configure source routing for the printers 8a, b, c, d over the network 10. The values for source routing may indicate the type of source route broadcast for the printer 8a, b, c, d to use, such as "single route" to send a single-route broadcast or "all routes" to send an all routes broadcast. The computer 4a, b, c, d may also specify the type of response for the printer 8a, b, c, d to use.

Thus, the term "feature" as used herein refers to the capabilities offered at a particular printer, such as simplex/duplex, printer quality, console lock, network interfaces, etc. The term "value" as used herein refers to the content of the feature, i.e., the setting or value set at the printer for a particular feature. For instance, the value of the printer quality feature could be normal, economy, refined, etc.; the values of the simplex/duplex feature may indicate whether duplex is set and a particular setting for duplex; the value for the console lock feature would indicate either on or off, etc.

Graphical User Interface for Controlling Printer Settings

Figure 2:
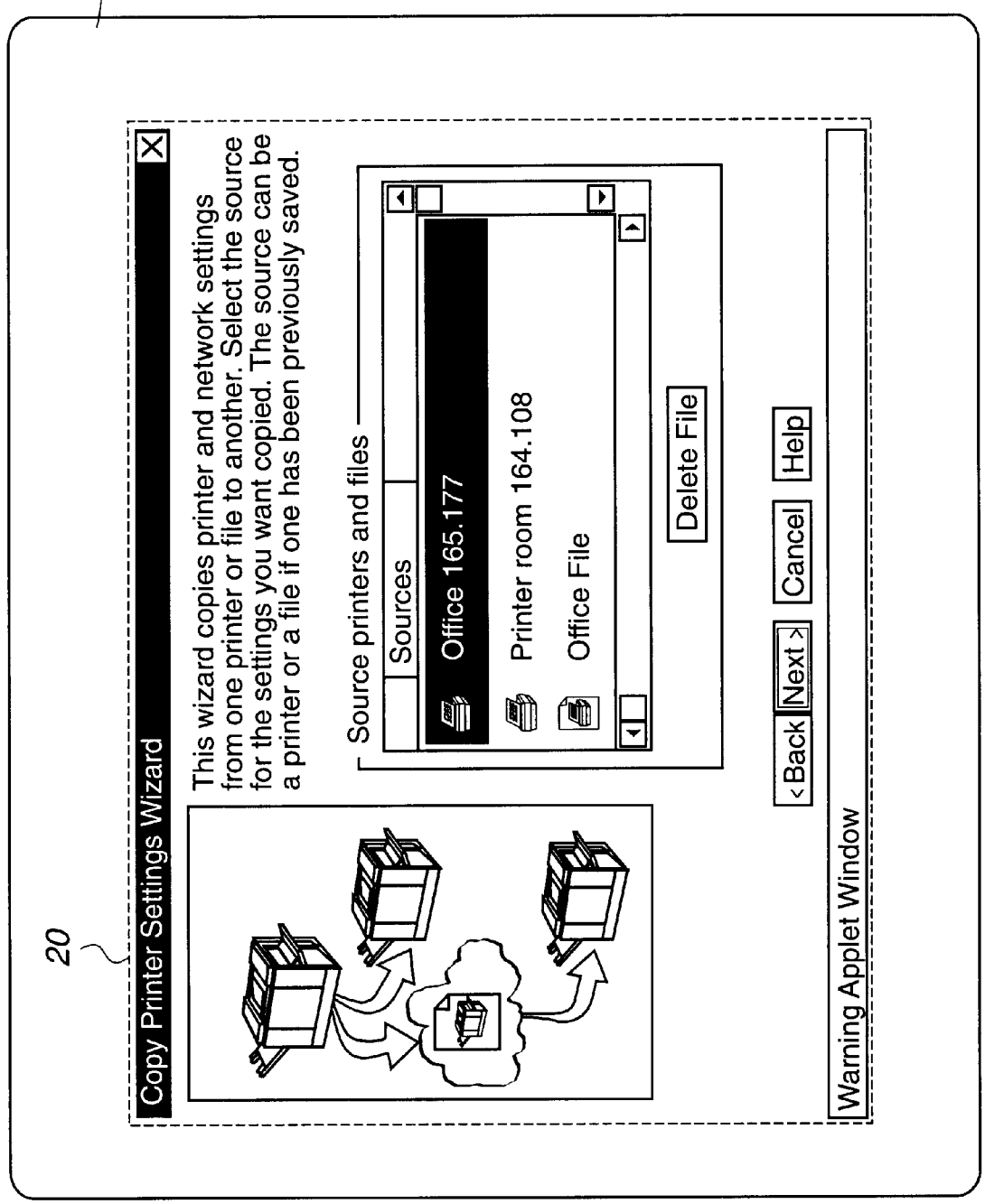
FIGS. 2–7 illustrate dialog boxes displayed on a computer monitor in accordance with preferred embodiments of the present invention.

FIGS. 2–8 illustrate a graphical user interface displayed on a display monitor 6a, b, c, d attached to the computer 4a, b, c, d which guides the network administrator through configuring the settings for a group of printers. FIG. 2 illustrates a graphical user interface (GUI) dialog box displayed on the monitor 6a, b, c, d. The dialog box may be moved within the window displayed on the monitor 6a, b, c, d. Using an input device, the user at the computer 4a, b, c, d may select a source for the values of printer features to copy to selected target printers. The user may select either an actual printer 8a, b, c, d or a printer file including printer settings. The printer file is a data file stored in a storage area of the computer 4a, b, c, d. Printer files are created to store various printer settings. The user can then apply the printer file to a printer 8a, b, c, d to configure the printer 8a, b, c, d according to the settings maintained in the printer file.

Figure 3:
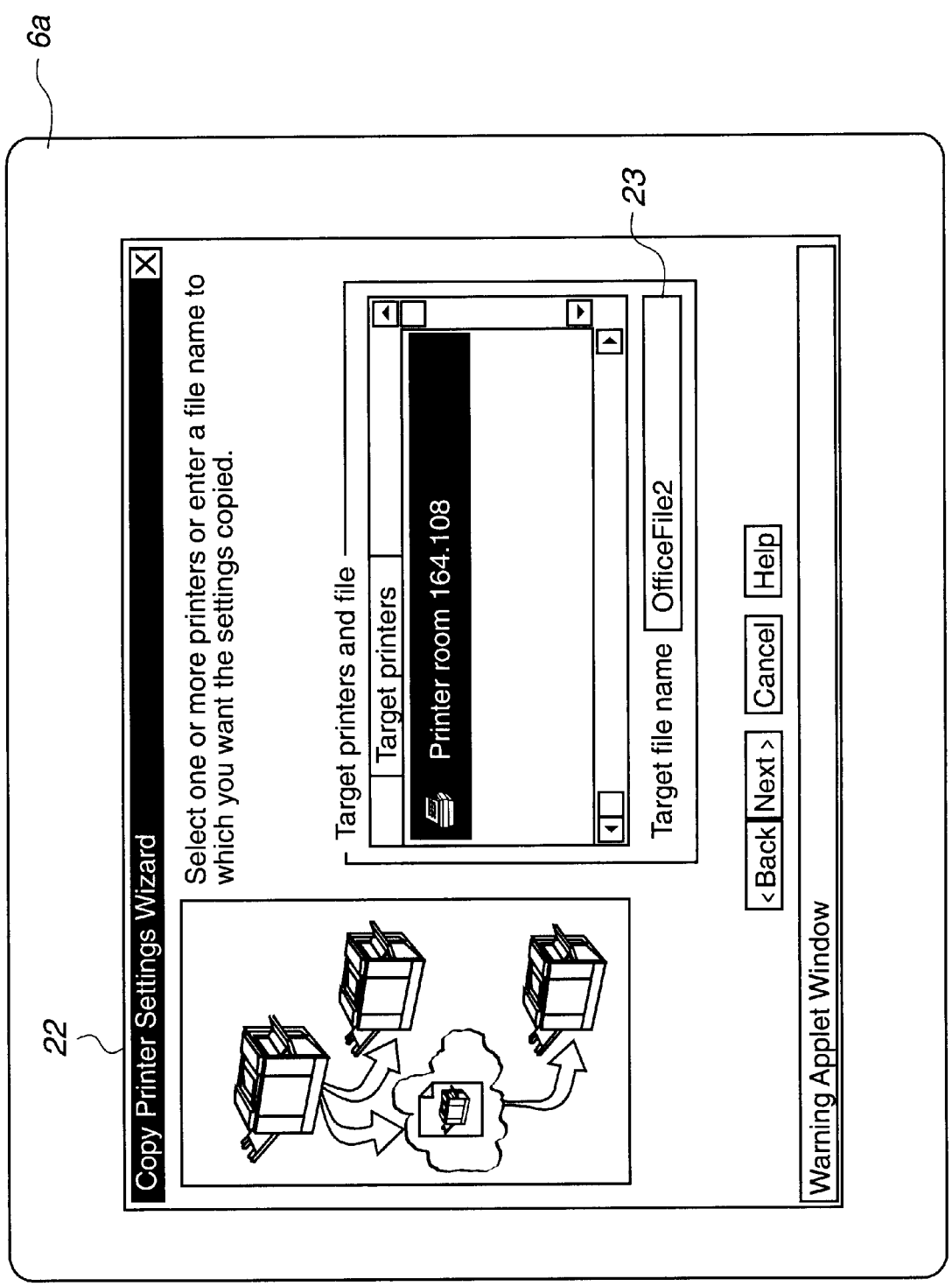
Figure 4:
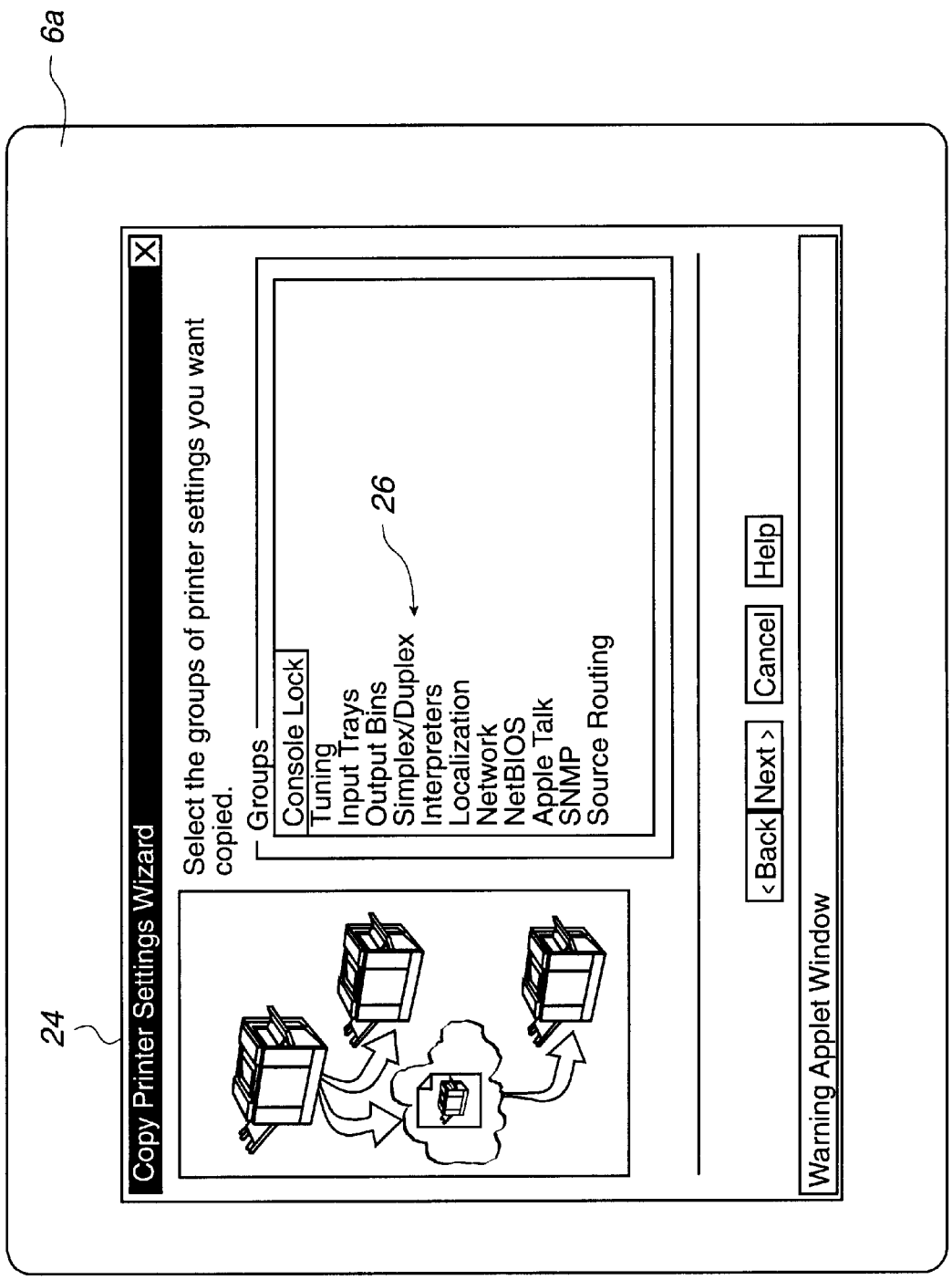

FIG. 3 illustrates a dialog box 22 in which the user selects with an input device one or more target printers 8a, b, c, d and/or a printer file. To select a target file, the user may enter a printer file name in the file name box 23 to create a target file to receive the source values. After selecting a source printer 8a, b, c, d or file and target printers 8a, b, c, d and/or a printer file, the dialog box 24 shown in FIG. 4 is displayed on the monitor 6a, b, c, d. The dialog box 24 lists groups of features 26 available in the source printer 8a, b, c, d or printer file. A user would select the features from the displayed groups of source features 26. The values for the selected features would be copied to the target printers 8a, b, c, d and/or printer file.

Figure 5:
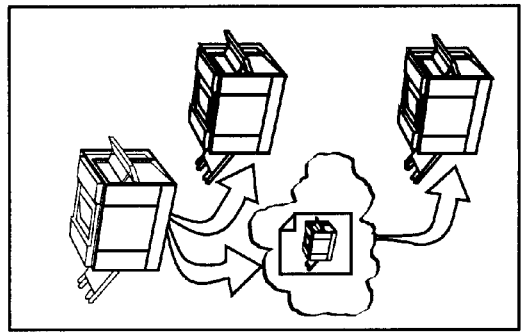

FIG. 5 illustrates a dialog box 28 displayed on the monitor 6a, b, c, d after features from the displayed group of features 26 are selected in dialog box 24. This dialog box 28 shows the selected source printer or file, target printers 8a, b, c, d, and/or target printer file. In preferred embodiments, the dialog box 28 may also display the value set in the source for each selected source feature to copy. For instance, in FIG. 5, the user selected the console lock feature to copy the value for the console lock feature at the source to the target. The dialog box 28 displays the current value for the console lock setting in the source printer "Office," which in the example of FIG. 5 is false. A false value for console lock indicates that the console is not locked at the printer "Office." The present value set at the source is copied to the targets. Thus, if the value for the console lock feature in the source is "off," the copying of the console lock value from the source to targets will unlock the console in those target printers 8*a, b, c, d* and/or printer file capable of console locking.

Figure 6:
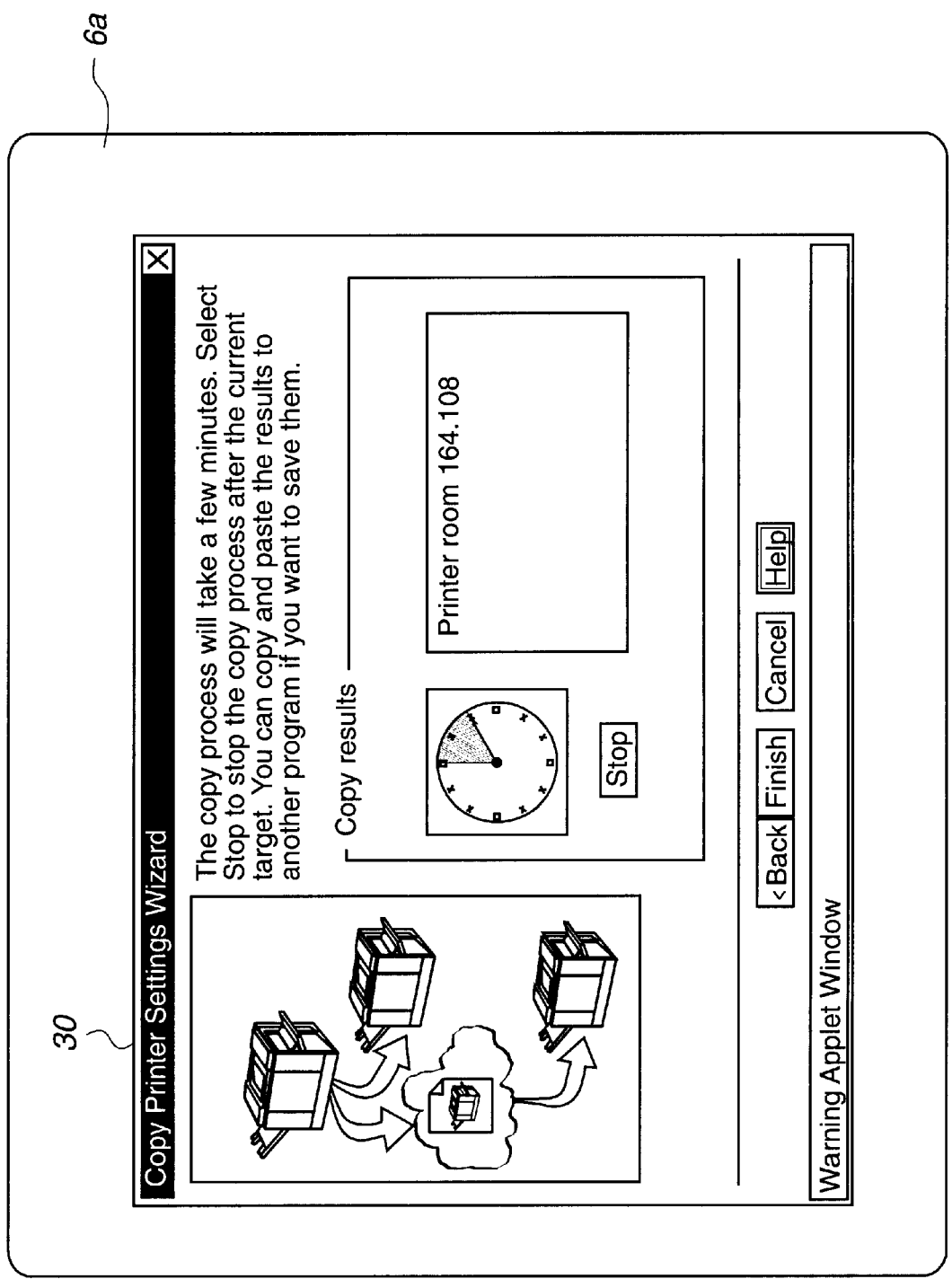
Figure 7:
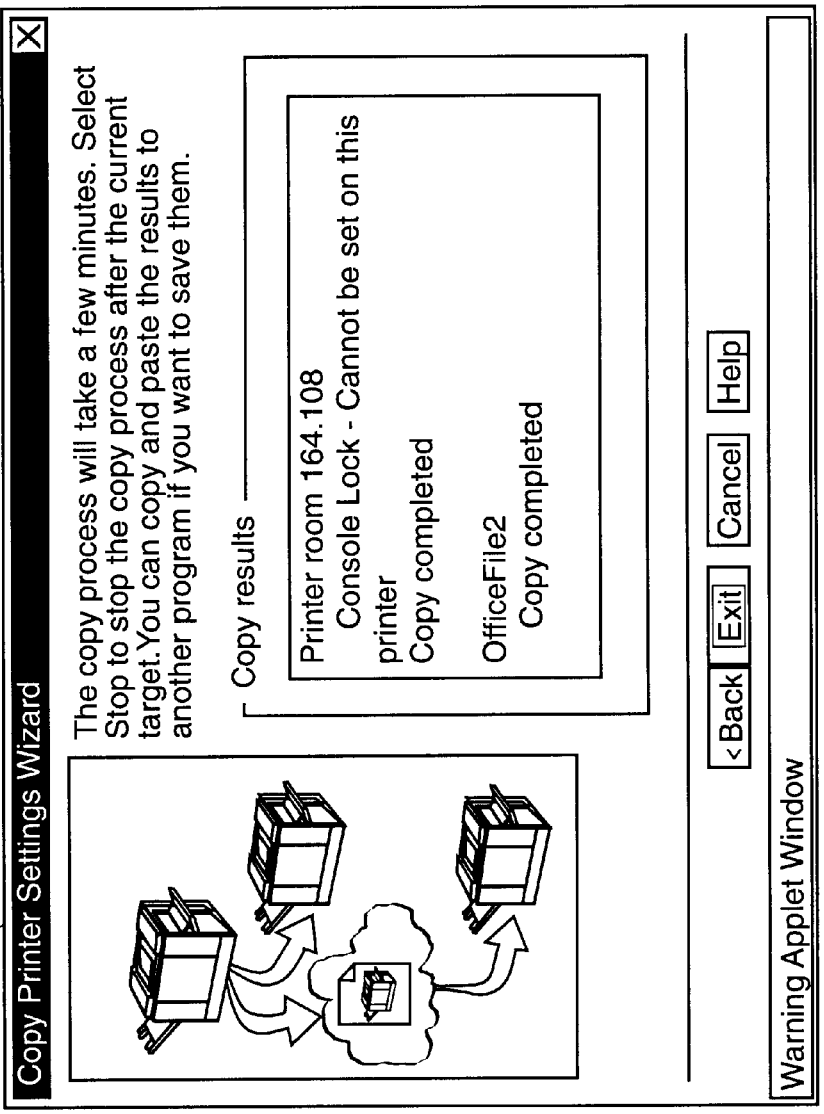

The user may select the "Finish" button to invoke the process of copying the values for the selected features and configurations to the target printers 8*a, b, c, d* and/or printer file. Upon selecting "Finish" in the dialog box 28, the dialog box 30 illustrated in FIG. 6 is displayed on the monitor 6*a, b, c, d*. This shows the target printer 8*a, b, c, d* and/or file to which the values are currently being applied, which in the displayed example is the printer named "Printer room." The dialog box 30 may also display target printers and/or a printer file previously configured with the values from the source. After the values from the selected source features are applied to all the target printers and/or printer file, the dialog box 32 illustrated in FIG. 7 is displayed showing the results of copying the values form the source to the target. This dialog box 32 shows which values failed to copy over successfully. For instance, the value for the console lock feature was not copied from the source printer "Office" to the target printer "Printer room" as the console lock feature is not an available feature on the target printer "Printer room," i.e., one cannot lock the console of the printer "Printer room." All values for the selected source features were successfully applied to the printer file named "Office-File2." In preferred embodiments, all values will successfully copy to a target printer file, which merely stores values for subsequent use.

With the GUI dialog boxes illustrated in FIGS. 2–7, a network administrator or other user may copy at once properties, features, and settings from one source printer 8*a, b, c, d* or printer file to multiple target printers and/or a printer file. Further, the target printers 8*a, b, c, d* that are configured with the source values may be from different manufacturers, e.g., Lexmark International Group, Inc., Hewlett-Packard Company, Xerox Corporation, etc, and be of different models. A computer 4*a, b, c, d* may configure printers 8*a, b, c, d* in accordance with the preferred embodiments, regardless of the make or model of the printers 8*a, b, c, d*, as long as the target printers 8*a, b, c, d* include one or more network protocols that are compatible with one or more of the network protocols used by the computer 4*a, b, c, d* copying the values from the source to the target. In preferred embodiments, the computer 4*a, b, c, d* may perform the copy operation of source values to targets as long as the computer 4*a, b, c, d* includes one or more network protocols compatible with one of the network protocols used by the source and target printers 8*a, b, c, d*. Thus, as long as the computer 4*a, b, c, d* has network protocols compatible with one network protocol used in each source and target printer 8*a, b, c, d*, the source and target printers 8*a, b, c, d* themselves do not have to have compatible network protocols.

Operation of Interface

Figure 8:
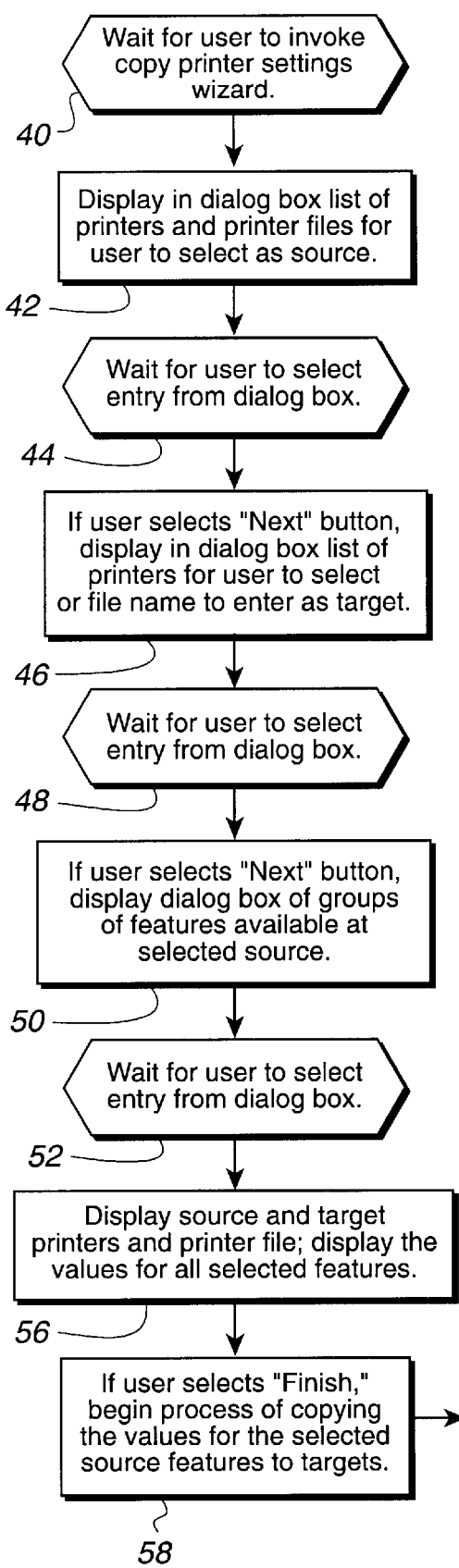
FIG. 8 illustrates logic to copy values from a target printer to a plurality of printers over a network in accordance with preferred embodiments of the present invention.
Figure 8:
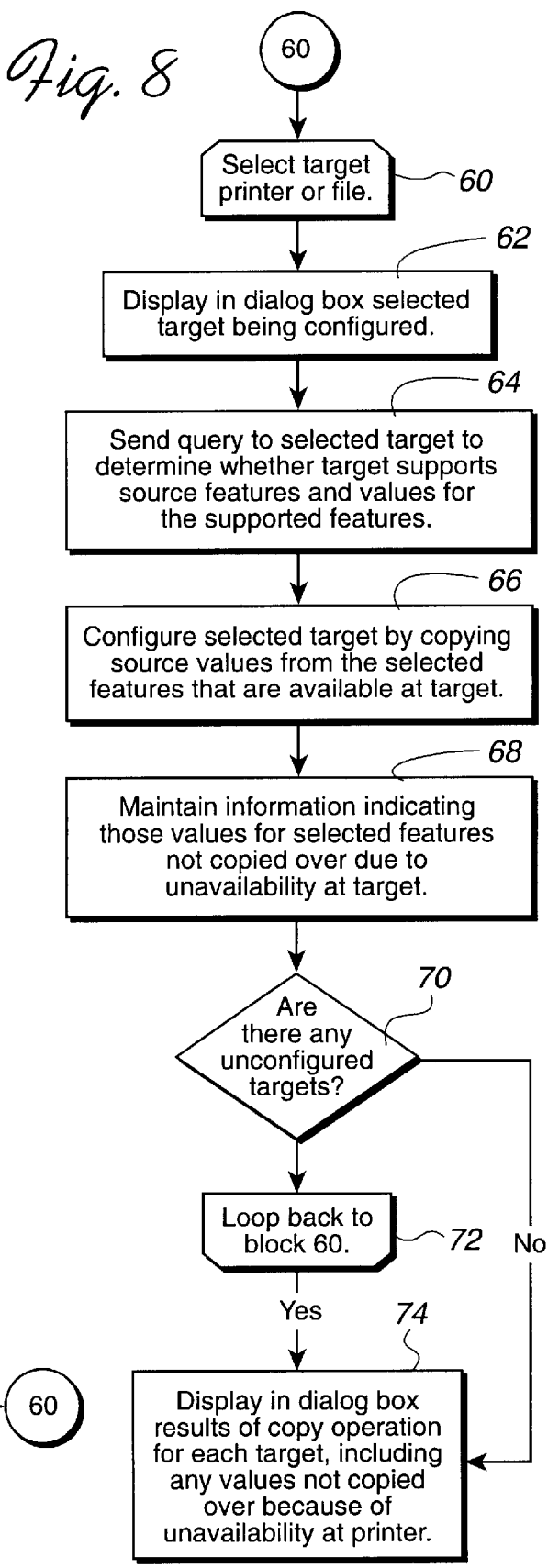

FIG. 8 illustrates logic implemented in the computer 4*a, b, c, d* within an application program or as part of the operating system to configure the features on printers 8*a, b, c, d* over the network 10. The logic of FIG. 8 may generate a GUI interface to sequence the user through a series of steps to configure the values of features for multiple target printers and/or a printer file using a copy printer settings wizard. A "wizard" is an instructional help means, usually implemented through a graphical user interface (GUI), that guides a user through a series of steps to accomplish a task. The printers 8*a, b, c, d* may be from different manufacturers and of different model types. Control begins at block 40 which represents the computer 4*a, b, c, d* waiting for a user to invoke the copy printer settings wizard from a menu. Control transfers to block 42 where the computer 4*a, b, c, d* displays a dialog box, such as the dialog box 20 shown in FIG. 2, which displays printers and printer files the user may select as the source for the values. Otherwise, a default source will be selected based on stored information indicating a default. Control transfers to block 44 where the computer 4*a, b, c, d* waits for the user to select a button, e.g., "Back," "Next," "Cancel," or "Help," from the dialog box 20.

If the user selects the "Next" button, then control transfers to block 46 where the computer 4*a, b, c, d* displays on the monitor 6*a, b, c, d* a dialog box 22, shown in FIG. 3, that displays printers 8*a, b, c, d* for the user to select as targets. Further, the user may enter the name of a target printer file in the box 23 in dialog box 22 to provide a target printer file. If the user selected another displayed button, then the selected action would be performed, e.g., display the previous dialog box 20 upon selection of "Back," display a help menu upon selection of "Help," or cancel the copy printer setting Wizard upon selection of the "Cancel" button. From block 46, control transfers to block 48 where the computer 4*a, b, c, d* waits for the user to select an action from the dialog box 22. If the user selects one or more target printers 8*a, b, c, d* and/or enters a target printer file name and the "Next" button, then at block 50 the computer 4*a, b, c, d* displays a dialog box 24, shown in FIG. 4, displaying groups of features 26 associated with the selected source. As discussed, other actions would be performed upon the user selecting one of the other display buttons.

Control then transfers to block 52 where computer 4*a, b, c, d* waits for the user to select an entry from the dialog box 24. If the user selected one or more groups of features 26 and the "Next" button, then control transfers to block 56 where the computer 4*a, b, c, d* displays a dialog box 28, shown in FIG. 5, which lists the selected printer 8*a, b, c, d* or printer file for the source, the selected features, the selected targets, and the values of all selected feature being copied from the source to the target, e.g., the specific default input tray for the source, whether the source console is locked or unlocked, etc. For instance, in FIG. 5, the value of the console lock feature is "false," which means the console at the source printer 8*a, b, c, d* or printer file is unlocked. If the user selected the "Finish" button in dialog box 28, then the computer 4*a, b, c, d* would begin the process of copying values for the selected features from the source printer 8*a, b, c, d* or printer file to the targets. Selection of other buttons in dialog box 28 would result in different actions as discussed above.

Control then transfers to block 60 which is the start of a loop that continues while there are target printers 8*a, b, c, d* and/or a printer file that have not been configured with the values of the selected source features. At block 60, the computer 4*a, b, c, d* selects a target printer 8*a, b, c, d* or printer file to configure. Control transfers to block 62 where the computer 4*a, b, c, d* displays in dialog box 30, shown in FIG. 6, the selected target printer or file currently being configured. Dialog box 30 may also display targets configured with source settings during previous iterations of the loop starting at block 60. If the target is a printer 8*a, b, c, d*, then control transfers to block 64 where the computer 4*a, b, c, d* transmits a query over the network 10 to the target printer 8*a, b, c, d* to determine whether the target printer 8*a, b, c, d* supports both the selected feature and the source value for the selected feature. For instance, the target printer 8*a, b, c, d* may support the selected feature, but may not be capable of implementing the source value for the selected feature. If the selected target was a printer file, then the computer 4a, b, c, d would just write the values for the selected source feature to the file. After determining which of the values for the selected features are supported at the target printer 8a, b, c, d, control transfers to block 66 where the computer 4a, b, c, d configures the selected target printer with the values for the selected group of features that are available at the target printer 8a, b, c, d, as determined from the query at block 64. In preferred embodiments, the computer 4a, b, c, d configures or copies values to the target printers 8a, b, c, d by transmitting via the network 10 those values for the selected features that are available at the target printer 8a, b, c, d. The target printer 8a, b, c, d then configures itself with the transmitted values and sends notification via the network 10 back to the computer 4a, b, c, d indicating that the values were successfully applied by the target printer 8a, b, c, d.

Control then transfers to block 68 where the computer 4a, b, c, d maintains information indicating those values for selected features not copied over to the target printer 8a, b, c, d because the target does not include the capability to implement such features. Control transfers to block 70 where the computer 4a, b, c, d determines whether there are any unconfigured targets. If so, control transfers to block 72 to loop back to block 60 until all target printers 8a, b, c, d and/or printer file have been configured with the values for the selected source features. Otherwise, control transfers to block 74 which represents the computer 4a, b, c, d displaying in the dialog box 32, shown in FIG. 7, the results of the copy operation. Displayed is each target and information indicating whether the copying of the values completed. The computer 4a, b, c, d further displays the values for the selected source features that were not copied because of the unavailability of the feature or value at the target. For instance, in FIG. 7, the dialog box 32 displays that the console lock value "off" was not copied over because the target printer, "Printer room" does not offer a console lock feature, i.e., "Cannot be set on this printer." The user may then terminate the copy printer settings wizard by selecting the "Exit" button.

With the logic and GUI of the preferred embodiments, a systems administrator may configure multiple printers with the values of selected features from a selected printer or file. Preferred embodiments copy the maximum number of values from selected source features by copying to a target printer 8a, b, c, d all the values for the selected source features that the target printer can implement. Further, printers of different makes and models may be configured at the same time.

Conclusions and Alternative Embodiments

This concludes the description of the preferred embodiments of the invention. The following describes some alternative embodiments for accomplishing the present invention.

The dialog boxes described in FIGS. 2–7 are for illustrative purposes. Graphical design elements and GUI functions may be added and removed without departing from the invention.

The logic of FIG. 8 may be implemented as hardware logic or software logic within the operating system of the computer 4a, b, c, d or an application program executed by the computer 4a, b, c, d. This logic is for illustrative purposes. Additional or alternative steps may be performed in addition to those illustrated in the logic. Further, the order of the steps in the preferred logic may also vary.

In preferred embodiments, the logic of FIG. 8 is implemented in an object oriented design program such as JAVA™. JAVA is a trademark of Sun Microsystems, Inc. The logic of FIG. 8 may be implemented as a network computing application and embedded in a software program that is installed on a Web server, such as a Hypertext Transfer Protocol (HTTP) server. In embodiments where the logic is implemented in Java, the logic of FIG. 8 may be executed from within an HTTP client, such as a Web browser or other Hypertext Markup Language (HTML) browser, e.g., the NETSCAPE® Communicator, the MICROSOFT® Internet Explorer, the IBM Internet Connection Server, the NETSCAPE Web Server, and the MICROSOFT Internet Information Server. NETSCAPE is a registered trademark of the Netscape Communications Corporation and MICROSOFT is a registered trademark of the Microsoft Corporation. Once launched from within a Web browser, the logic of FIG. 8 can execute outside of the Web browser to free up the Web browser to perform other activities.

Those skilled in the art will appreciate that the logic of FIG. 8 may be implemented in object oriented computer languages other than Java, such as C++, and may be implemented in non-object oriented languages, such as Basic, Pascal, FORTRAN, etc.

When the logic of FIG. 8 is implemented in a program, such as Java, that can be invoked from within a Web browser, then there is no need to maintain the software including the logic of FIG. 8 at the computer 4a, b, c, d executing the software as the software can be downloaded on an as needed basis from a server and executed from the Web browser.

By using an industry standard communication protocol, such as SNMP, the logic of FIG. 8 may configure the features and settings of printers from different vendors and of different model types that comply with the industry standard protocols used by the device, e.g., computer 4a, b, c, d, executing the logic. As discussed, any computer 4a, b, c, d and printer 8a, b, c, d may be capable of communicating using multiple network protocols. In such case, a computer need only have one common network protocol with the device to which the communication is directed.

Moreover, in further embodiments, a systems administrator may execute the logic of FIG. 8 at a remote location via a network 10, such as the Internet.

Preferred embodiments were described as implemented in a network printing system with respect to configuring the features and settings of printer devices. However, the embodiments of the present invention may be applied to any network system in which a computer 4a, b, c, d configures multiple attached components including different features and of different make and model. The preferred embodiments are not limited to configuring only printers and related output devices. For instance, preferred embodiments could apply to configuring facsimile machines, copiers, telephones, display devices, input/output devices, storage devices, communication systems, etc., in communication with the network system.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

In summary, preferred embodiments disclose a system and method for configuring a plurality of devices linked to a network with a computer also linked to the network. A computer determines from the devices a source device. The computer then determines a set of features from features implemented in the source device. At least one value is set for each feature in the source device. The computer also determines at least one target device. For each target device, the computer then determines features from the determined set of features that the target device is capable of implementing. The computer then transmits to each target device via the network the values for the determined features the target device is capable of implementing. If there are multiple target devices, then different sets of values from the determined set of features may be transmitted to different target devices when the target devices have different capabilities with respect to the determined set of features. The target devices are configured with the values transmitted over the network.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for configuring a target device linked to a network, wherein a plurality of devices communicate over the network, comprising the steps of:

determining a source device from the devices;

determining a set of features from features implemented in the source device, wherein at least one value is set for each feature in the source device;

determining features from the determined set of features that the target device is capable of implementing, wherein the determined features the target device is capable of implementing differ from the determined set of features;

transmitting to the target device the values for the determined features that the target device is capable of implementing via the network, wherein the target device is configured with the values transmitted over the network; and generating information on values for determined features not transmitted to the target device upon determining that the target device is not capable of implementing the values for the determined features.

2. A method for configuring a plurality of devices linked to a network, comprising the steps of:

determining a source device from the devices;

determining a set of features from features implemented in the source device, wherein at least one value is set for each feature in the source device;

determining from the devices a plurality of target devices;

for each target device, determining features from the determined set of features that the target device is capable of implementing;

for each target device, transmitting to the target device the values for the determined features that the target device is capable of implementing via the network, wherein the target device is configured with the values transmitted over the network, and wherein different sets of values from the determined set of features are transmitted to different target devices when the target devices have different capabilities with respect to the determined set of features; and generating information on values for determined features not transmitted to the target device upon determining that the target device is not capable of implementing the values for the determined features.

3. The method of claim 2, wherein the step of determining the features which the target device is capable of implementing further comprises determining whether the target device is capable of implementing the values set in the source device for the determined features that the target device is capable of implementing, wherein the step of transmitting comprises transmitting only those values the target device is capable of implementing.

4. The method of claim 2, wherein the steps of determining the source device, the set of features and the target devices comprise an operation that is a member of the set of operations comprising receiving information indicating the source device, the set of features, and the target devices from a user operated input device and retrieving default information indicating the source device, the set of features, and the target devices from a storage area.

5. The method of claim 2, wherein the determined set of features are capable of being selected from a source file including features and values set thereof and wherein the target devices are capable of including at least one file to store values for selected features.

6. The method of claim 2, wherein the target and source devices are printers and the steps of determining the features, the target devices, and transmitting the values are performed by a computer, wherein the target printers and computer communicate via the network.

7. The method of claim 6, wherein the determined features from the source printer are comprised of at least one feature that is a member of the set of features comprising:

network interface properties, wherein the target printers are configured with values for the network interface properties to control how the target printers use the network interface to communicate over the network;

print modes including simplex and duplex features;

a console lock feature, wherein a first value locks the printer console and a second value unlocks the printer console; and an authentication protocol which is used to access the target printers over the network.

8. The method of claim 2, wherein the step of determining the features from the source device comprises the steps of:

displaying on a computer monitor a first graphical dialog box displaying a list of devices;

receiving input from an input device indicating a selected source device from the devices displayed in the first graphical dialog box;

displaying on the computer monitor a second graphical dialog box displaying features implemented within the selected source device; and receiving input from the input device indicating a value for at least one feature to apply to the target devices from the features displayed in the second graphical dialog box.

9. The method of claim 8, wherein the step of determining the plurality of target devices, comprises the steps of:
  displaying on the computer monitor a third graphical dialog box displaying a list of devices; and
  receiving input from the input device indicating at least one target device from the list of devices displayed in the third graphical dialog box.

10. The method of claim 9, further comprising the step of displaying a fourth graphical display box indicating the values for the selected features to transmit to the at least one target device.

11. A method for configuring a plurality of devices linked to a network, comprising:
  (a) determining a source device from the devices by:
    (i) displaying on a computer monitor a first graphical dialog box displaying a list of devices;
    (ii) receiving input from an input device indicating a selected source device from the devices displayed in the first graphical dialog box;
  (b) determining a set of features from features implemented in the source device, wherein at least one value is set for each feature in the source device by:
    (i) displaying on the computer monitor a second graphical dialog box displaying features implemented within the selected source device; and
    (ii) receiving input from the input device indicating a value for at least one feature to apply to target devices from the features displayed in the second graphical dialog box;
  (c) determining from the devices a plurality of target devices by:
    (i) displaying on the computer monitor a third graphical dialog box displaying a list of devices; and
    (ii) receiving input from the input device indicating at least one target device from the list of devices displayed in the third graphical dialog box;
  (d) for each target device, determining features from the determined set of features that the target device is capable of implementing;
  (e) for each target device, transmitting to the target device the values for the determined features that the target device is capable of implementing via the network, wherein the target device is configured with the values transmitted over the network, and wherein different sets of values from the determined set of features are transmitted to different target devices when the target devices have different capabilities with respect to the determined set of features; and
  (f) displaying in a fourth graphical dialog box information indicating whether the target device was configured with the transmitted values and displaying, for each target device, information indicating values for selected features that are not transmitted upon determining that the target device is not capable of implementing the values for the determined features.

12. The method of claim 2, wherein the steps of determining the source device, determining the features, determining the target devices, determining the features which the target devices can implement, and transmitting the values are implemented in a software program written in an object oriented computer language that is capable of being executed from a Web browser.

13. A system for configuring a target device linked to a network, comprising:
  a processing unit capable of communicating with the plurality of devices over the network; and
  program logic executed by the processing unit, comprising:
    (i) means for determining a source device from the devices;
    (ii) means for determining a set of features from features implemented in the source device, wherein at least one value is set for each feature in the source device;
    (iii) means for determining features from the determined set of features that the target device is capable of implementing, wherein the determined features the target device is capable of implementing differ from the determined set of features;
    (iv) means for transmitting to the target device the values for the determined features that the target device is capable of implementing via the network, wherein the target device is configured with the values transmitted over the network; and
    (v) means for generating information on values for determined features not transmitted to the target device upon determining that the target device is not capable of implementing the values for the determined features.

14. A system for configuring a plurality of devices linked to a network, comprising:
  a processing unit capable of communicating with the plurality of devices over the network; and
  program logic executed by the processing unit, comprising:
    (i) means for determining from the devices a source device;
    (ii) means for determining a set of features from features implemented in the source device, wherein at least one value is set for each feature in the source device;
    (iii) means for determining from the devices a plurality of target devices;
    (iv) means for determining, for each target device, features from the determined set of features that each target device is capable of implementing;
    (v) means for transmitting to each target device the values for the determined features that each target device is capable of implementing via the network, wherein each target device is configured with the values transmitted for each target device over the network, and wherein different sets of values from the determined set of features are transmitted to different target devices when the target devices have different capabilities with respect to the determined set of features; and
    (vi) means for generating information on values for determined features not transmitted to the target device upon determining that the target device is not capable of implementing the values for the determined features.

15. The system of claim 14, wherein the means for determining the features which each target device is capable of implementing further comprises determining whether each target device is capable of implementing the values set in the source device for the determined features that each target device is capable of implementing, wherein the means of transmitting comprises transmitting only those values each target device is capable of implementing.

16. The system of claim 14, further comprising a user operated input device in communication with the processing unit, wherein the program logic further comprises means for receiving from the input device information indicating the source device, the set of features and the target devices.

17. The system of claim 14, wherein the program logic further comprises means for determining the features from a source file including feature values and wherein the target devices are capable of including at least one file to store values for selected features.

18. The system of claim 14, wherein the target and source devices are comprised of printers, wherein the target printers and processing unit communicate via the network.

19. The system of claim 18, wherein the determined features from the source printer are comprised of at least one feature that is a member of the set of features comprising:

network interface properties, wherein the target printers are configured with values for the network interface properties to control how the target printers use the network interface to communicate over the network;

print modes including simplex and duplex features;

a console lock feature, wherein a first value locks the printer console and a second value unlocks the printer console; and an authentication protocol which is used to access the target printers over the network.

20. The system of claim 14, further comprising a computer monitor in communication with the processing unit and an input device for transmitting data to the processing unit, wherein the means for determining the features from the source device comprises:

means for displaying on a computer monitor a first graphical dialog box displaying a list of devices;

means for receiving input from the input device indicating a selected source device from the devices displayed in the first graphical dialog box;

means for displaying on the computer monitor a second graphical dialog box displaying features implemented within the selected source device; and means for receiving input from the input device indicating a value for at least one feature to apply to the target devices from the features displayed in the second graphical dialog box.

21. The system of claim 20, wherein the means for determining the plurality of target devices, comprises:

means for displaying on the computer monitor a third graphical dialog box displaying a list of devices; and means for receiving input from the input device indicating at least one target device from the list of devices displayed in the third graphical dialog box.

22. The system of claim 21, wherein the program logic further comprises means for displaying a fourth graphical display box indicating the values for the selected features to transmit to the at least one target device.

23. A system for configuring a plurality of devices linked to a network, comprising:

a processing unit capable of communicating with the plurality of devices over the network; and a computer monitor in communication with the processing unit and an input device for transmitting data to the processing unit;

program logic executed by the processing unit, comprising:

(a) means for determining a source device from the devices by:

(i) displaying on a computer monitor a first graphical dialog box displaying a list of devices;

(ii) receiving input from an input device indicating a selected source device from the devices displayed in the first graphical dialog box;

(b) means for determining a set of features from features implemented in the source device, wherein at least one value is set for each feature in the source device by:

(i) displaying on the computer monitor a second graphical dialog box displaying features implemented within the selected source device; and (ii) receiving input from the input device indicating a value for at least one feature to apply to target devices from the features displayed in the second graphical dialog box;

(c) determining from the devices a plurality of target devices by:

(i) displaying on the computer monitor a third graphical dialog box displaying a list of devices; and (ii) receiving input from the input device indicating at least one target device from the list of devices displayed in the third graphical dialog box;

(d) for each target device, determining features from the determined set of features that the target device is capable of implementing; and (e) for each target device, transmitting to the target device the values for the determined features that the target device is capable of implementing via the network, wherein the target device is configured with the values transmitted over the network, and wherein different sets of values from the determined set of features are transmitted to different target devices when the target devices have different capabilities with respect to the determined set of features;

(f) displaying in a fourth graphical dialog box information indicating whether the target device was configured with the transmitted values and displaying, for each target device, information indicating values for selected features that are not transmitted upon determining that the target device is not capable of implementing the values for the determined features.

24. The system of claim 14, wherein the program logic is implemented in a software program written in an object oriented computer language that is capable of being executed from a Web browser.

25. An article of manufacture for use in programming a computer to configure a target device over a network, the article of manufacture comprising a computer usable medium including at least one computer program that causes the computer to perform the steps of:

determining a source device from the devices;

determining a set of features from features implemented in the source device, wherein at least one value is set for each feature in the source device;

determining features from the determined set of features that the target device is capable of implementing, wherein the determined features the target device is capable of implementing differ from the determined set of features;

transmitting to the target device the values for the determined features that the target device is capable of implementing via the network, wherein the target device is configured with the values transmitted over the network; and generating information on values for determined features not transmitted to the target device upon determining that the target device is not capable of implementing the values for the determined features.

26. An article of manufacture for use in programming a computer to configure a plurality of devices over a network, the article of manufacture comprising a computer usable medium including at least one computer program that causes the computer to perform the steps of:

determining from the devices a source device;

determining a set of features from the features implemented in the source device, wherein at least one value is set for each feature in the source device;

determining from the devices a plurality of target devices;

for each target device, determining features from the determined set of features that the target device is capable of implementing;

for each target device, transmitting to the target device the values for the determined features that the target device is capable of implementing via the network, wherein the target device is configured with the values transmitted over the network, and wherein different sets of values from the determined set of features are transmitted to different target devices when the target devices have different capabilities with respect to the determined set of features; and generating information on values for determined features not transmitted to the target device upon determining that the target device is not capable of implementing the values for the determined features.

27. The article of manufacture of claim 26, wherein the step of determining the features which the target device is capable of implementing further comprises determining whether the target device is capable of implementing the values set in the source device for the determined features that the target device is capable of implementing, wherein the step of transmitting comprises transmitting only those values the target device is capable of implementing.

28. The article of manufacture of claim 26, wherein the steps of determining the source device, the set of features and the target devices comprise an operation that is a member of the set of operations comprising receiving information indicating the source device, the set of features, and the target devices from a user operated input device and retrieving default information indicating the source device, the set of features, and the target devices from a storage area.

29. The article of manufacture of claim 26, wherein the determined set of features are capable of being determined from a source file including feature values and wherein the target devices are capable of including at least one file to store values for selected features.

30. The article of manufacture of claim 26, wherein the target and source devices are printers and the steps of determining the features, the target devices, and transmitting the values are performed by a computer, wherein the target printers and computer communicate via the network.

31. The article of manufacture of claim 30, wherein the determined features from the source printer are comprised of at least one feature that is a member of the set of features comprising:

network interface properties, wherein the target printers are configured with values for the network interface properties to control how the target printers use the network interface to communicate over the network;

print modes including simplex and duplex features;

a console lock feature, wherein a first value locks the printer console and a second value unlocks the printer console; and an authentication protocol which is used to access the target printers over the network.

32. The article of manufacture of claim 26, wherein the step of determining the features from the source device comprises the steps of:

displaying on a computer monitor a first graphical dialog box displaying a list of devices;

receiving input from an input device indicating a selected source device from the devices displayed in the first graphical dialog box;

displaying on the computer monitor a second graphical dialog box displaying features implemented within the selected source device; and receiving input from the input device indicating a value for at least one feature to apply to the target devices from the features displayed in the second graphical dialog box.

33. The article of manufacture of claim 32, wherein the step of determining the plurality of target devices, comprises the steps of:

displaying on the computer monitor a third graphical dialog box displaying a list of devices; and receiving input from the input device indicating at least one target device from the list of devices displayed in the third graphical dialog box.

34. The article of manufacture of claim 33, further comprising the step of displaying a fourth graphical display box indicating the values for the selected features to transmit to the at least one target device.

35. An article of manufacture for use in programming a computer to configure a plurality of devices over a network, wherein the computer includes a computer monitor and input device, and wherein the article of manufacture comprising a computer usable medium including at least one computer program that causes the computer to perform the steps of:

(a) determining from the devices a source device by:

i. displaying on the computer monitor a first graphical dialog box displaying a list of devices;

ii. receiving input from the input device indicating a selected source device from the devices displayed in the first graphical dialog box;

(b) determining a set of features from the features implemented in the source device, wherein at least one value is set for each feature in the source device by:

i. displaying on the computer monitor a second graphical dialog box displaying features implemented within the selected source device; and ii. receiving input from the input device indicating a value for at least one feature to apply to target devices from the features displayed in the second graphical dialog box;

(c) determining from the devices a plurality of target devices by:

i. displaying on the computer monitor a third graphical dialog box displaying a list of devices; and ii. receiving input from the input device indicating at least one target device from the list of devices displayed in the third graphical dialog box;

(d) for each target device, determining features from the determined set of features that the target device is capable of implementing;

(e) for each target device, transmitting to the target device the values for the determined features that the target device is capable of implementing via the network, wherein the target device is configured with the values transmitted over the network, and wherein different sets of values from the determined set of features are transmitted to different target devices when the target devices have different capabilities with respect to the determined set of features; and (f) displaying in a fourth graphical dialog box information indicating whether the target device was configured with the transmitted values and displaying, for each target device, information indicating that a value for a selected feature was not applied upon determining that the target device is not capable of implementing the value for the determined feature.

36. The article of manufacture of claim 26, wherein the steps of determining the source device, determining the features, determining the target devices, determining the features which the target devices can implement, and transmitting the values are implemented in a software program written in an object oriented computer language that is capable of being executed from a Web browser.

37. The method of claim 1, wherein determining features from the determined set of features that the target device is capable of implementing further comprises:

transmitting a query to the target device to determine whether the target device supports the determined features.

38. The method of claim 2, wherein determining features from the determined set of features that the target device is capable of implementing further comprises:

transmitting a query to the target device to determine whether the target device supports the determined features.

39. The system of claim 13, wherein the means for determining features from the determined set of features that the target device is capable of implementing further performs:

transmitting a query to the target device to determine whether the target device supports the determined features.

40. The system of claim 14, wherein the means for determining features from the determined set of features that each target device is capable of implementing further performs:

transmitting a query to each target device to determine whether each target device supports the determined features.

41. The article of manufacture of claim 25, wherein the step of determining features from the determined set of features that the target device is capable of implementing further comprises:

transmitting a query to the target device to determine whether the target device supports the determined features.

42. The article of manufacture of claim 26, wherein the step of determining features from the determined set of features that the target device is capable of implementing further comprises:

transmitting a query to the target device to determine whether the target device supports the determined features.

* * * * *